Nov. 15, 1966  D. L. McCURDY  3,285,132
ARMING UNIT

Filed Jan. 8, 1964  2 Sheets-Sheet 1

INVENTOR.
DONALD L. McCURDY
BY
Miller, Morris & Pappas
ATTORNEYS

Nov. 15, 1966     D. L. McCURDY     3,285,132
ARMING UNIT
Filed Jan. 8, 1964     2 Sheets-Sheet 2
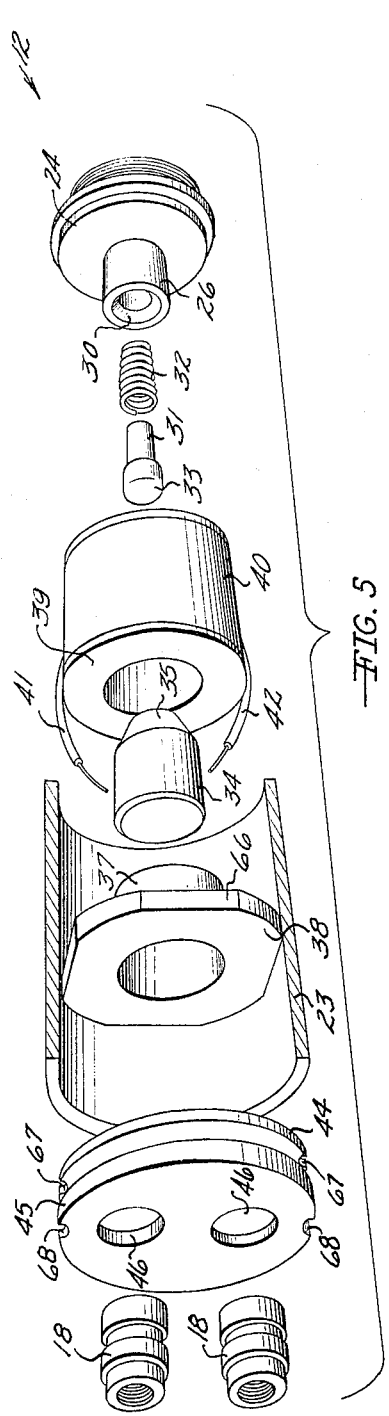
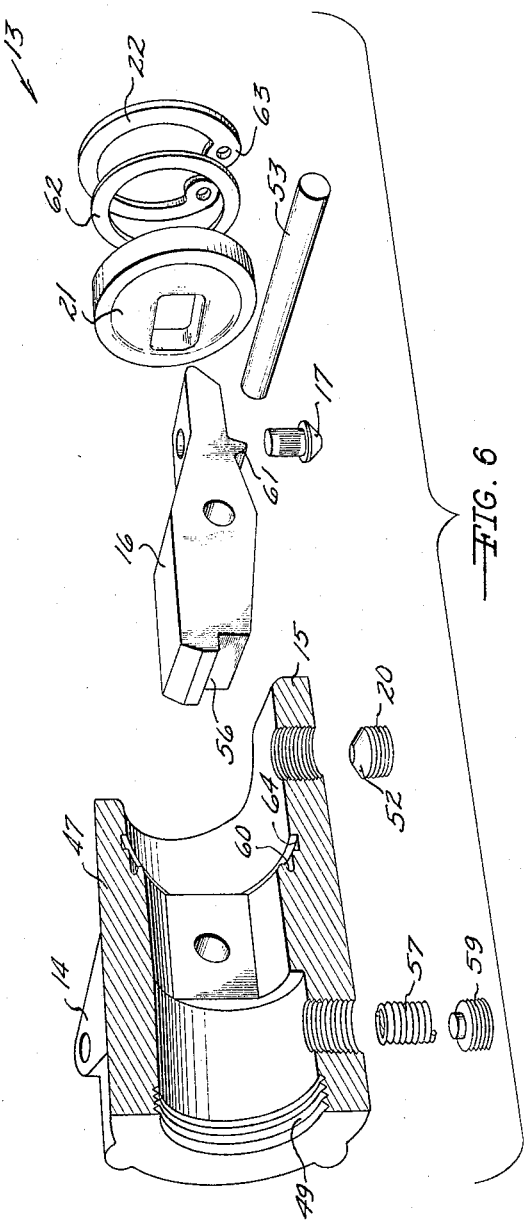

United States Patent Office 3,285,132
Patented Nov. 15, 1966

3,285,132
ARMING UNIT
Donald L. McCurdy, Grand Rapids, Mich., assignor to Jervis Corporation, Grandville, Mich., a corporation of Michigan
Filed Jan. 8, 1964, Ser. No. 336,508
3 Claims. (Cl. 89—1.5)

The present invention relates to an arming unit and more particularly to a fixed post single moveable lever arming unit for the arming of projectiles, bombs and the like as released, for example, from aircraft. The present invention constitutes a substantial improvement over known arming structures of the solenoid type.

Arming devices are essentially selective locking latch mechanisms and serve to receive and hold an arming ring or arming wire which wire is in turn attached, for example, a bomb. To actuate the bomb, the wire must be held as the bomb falls away from an aircraft and the weight of the falling bomb causes withdrawal of the wire and energizes or activates the bomb so that it will detonate upon impact. In some instances the wire starts, or places in condition to start, fusing mechanisms. The bomb must be manipulated and handled in its deactivated condition, and when the bomb is carried by the aircraft, it must remain deactivated for the safety of aircraft personnel. Selective means for arming of the bombs or projectiles must be provided in the aircraft, and the present invention is accordingly directed to the devices called arming units which may be selectively energized by aircraft personnel at or prior to bomb release so that the energization or activation of the fuse train in the bomb occurs as the bomb leaves the aircraft. Such arming devices must also be provided with means to allow release of the bombs in a deactivated condition as necessity arises. Examples of arming units are set out in U.S. Letters Patent 2,987,655 and 2,992,594. Essentially, they comprise a lever arrangement in which two moveable jaws or grippers are biased toward each other to hold or retain an arming wire or ring. The wire or ring can be pulled from the jaws by a pull on the arming wire overcoming the bias applied to holding the jaws together. This pull is substantially below the force required to arm the projectile or bomb and facilitates the loading of the bomb on the aircraft in that the ring or wire loop is merely forced into and between the jaws of the levers. Similarly, for example, if a bomb should be accidentally dislodged or even purposely dropped from its hangers, the wire loop or ring readily pulls free from the jaws thereby preventing activation of the bomb or projectile. At the selection of the aircraft personnel, however, the jaws and levers are locked in their closed position by the action of a solenoid and associated apparatus so that the ring or wire loop is secured against removal. In such an event the release of a bomb or projectile results in the activation of the bomb or projectile, the wire thereupon setting the fuse elements in the bomb in a functioning position. The solenoid admits of simple in a direct locking of the levers from a remote portion of the aircraft.

Accordingly, the present invention moves substantially beyond the prior work and provides a simpler and safer structure admitting of extensive reduction in size and weight while eliminating assembly and dimensional control problems and thereby resulting in a more efficient and compact structure.

The adoption of a single moving latch lever in the present invention delimits criticality heretofore found in the twin opposed levers and as a consequence the present invention results in a device more resistant to icing blockage. Collaterally, the use of the single lever results in vast simplification of the lever case construction and actuating mechanism thus minimizing space requirements and shaving substantial weight from the finished structure.

In the solenoid assembly considerable improvement is found in the solenoid to mechanism linkage in that the power train is separated from the armature thereby simplifying the structure and in avoidance of chance three-point hang-up or bind in the moving armature. As will be appreciated, this allows a delimitation of criticality insofar as absolute concentricity is made unnecessary and lateral or radial bias applied by the lever to the blocking pin is not transmitted to the armature element in terms of stress. Action is extremely smooth and non-binding and the blocking mechanism becomes a part of the lever control only upon energization of the solenoid.

Accordingly, the principal object of the present invention is to provide a substantially improved arming device.

Another object is to provide an arming device having only a single lever on a single pivot.

Still another object is to provide an arming structure wherein the radially applied stresses on the blocking element are not translated to the armature.

Other objects include an armature arrangement wherein absolute concentricity is unnecessary, and wherein the armature element is given no chance of wedging or "hanging-up."

Other resulting objects, including simplicity, reduction in size and weight, and improvement in reliability will be appreciated by those skilled in the art as the description proceeds.

In the drawings:
FIGURE 1 is a top plan view of an arming device in accord with the present invention.

FIGURE 5 is a cutaway exploded perspective view of the solenoid assembly of the arming device of the present invention and illustrating the ease of assembly and the structural simplicity thereof.

FIGURE 6 is a cutaway exploded perspective view of the lever assembly of the present invention and clearly indicates the simplicity and structural compactness of the lever assembly.

*General description*

Figure 1:
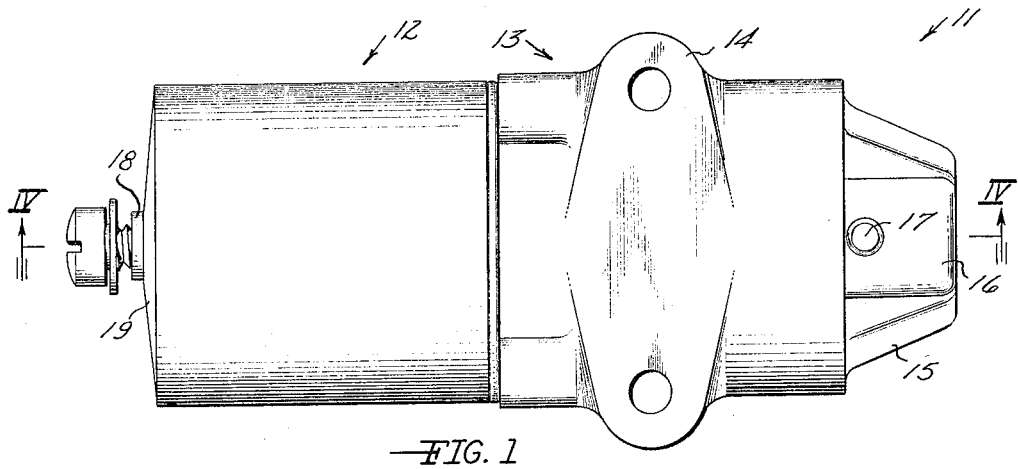

In general, the arming device of the present invention comprises a solenoid assembly and a lever assembly related to each other in a generally coaxial relation so that the power train of the solenoid section acts upon the lever section and accomplishes selected blockage of the lever system.

The solenoid assembly comprises a coil or solenoid windings on a spool, the spool in turn provides a lineal cylindrical pocket for an armature or plunger element which is moveable axially in the cylindrical opening provided by the spool, in accord with energization or de-energization of the coil. Actual journalling of the armature or plunger is by means of a tubular flanged end bell pressed into the spool.

The tubular sheath is closed at the end opposite the electrical contacts by a threaded mounting or connector plate pressed into the tubular sheath. A pin insert bushing is secured in the mounting plate coaxial with the spool and provides locating means for the spool. The bushing also provides a journal for a pin and socket for a compression spring urging the pin into normal contact with the armature. The spring and pin provide a return bias for the plunger or armature. The pin is located on the axis of the solenoid assembly and is moveable in accord with axial movement of the armature. As will be seen, the contact between pin and armature is a following contact so that minor deviation in axis as between pin and armature does not impair performance. This is particularly significant when radial forces are applied to the pin. Such forces are not imparted to the plunger. The threaded portion of the mounting or connector plate extends from the solenoid assembly providing for simple attachment to the lever assembly.

The leads from the coil are led to electrical contacts and suitable disc-like baffles provide locating means for the electrical contactor elements and guides for the leads. Additionally, the disc-like baffles provide assembly and locating control for the spool and coil structure. This assembly is then potted in situ by resin having high dielectric strength and the electrical structure is thus fully encapsulated in concentric relation within the tubular outer housing or sheath. The electrical contactors extend from the sheath or housing at one end being secured in the potting resin.

The lever assembly comprises a generally tubular housing having female threads into which the solenoid assembly is engaged. One end of the lever assembly is open and one edge extends outwardly to provide a protruding jaw support base. A transverse fulcrum pin extends through the lever assembly housing at a point slightly above the axis of the assembly and about midway between the ends of the housing. This pivot or fulcrum pin supports a lever which extends lengthwise through the lever assembly housing, the forward portion of the lever being provided with a conical headed jaw insert and the rearward portion of the lever being shouldered against the mounting plate fixing one direction of lever travel. Internal shoulders in the lever housing maintain the plane position of the lever against lateral shifting on the pivot pin. The rear portion of the lever is also recessed to registrably receive the blocking pin in the solenoid assembly when the lever is in the shouldered normal position. The lever is also recessed on its underside to provide a pocket for a spring element biasing the lever into normal shouldered relation. The lever spring is retained in position by an adjustable threaded guide screw extending upwardly through the lever housing. Upwardly, through the frontal extension of the lever assembly, projects a conical threaded jaw element which is in substantial axial closing register with the jaw insert carried by the lever. Accordingly, the threaded jaw element is stationary (once adjusted as to spacing) while the jaw insert in the lever moves with the lever, toward and away from the fixed jaw element. Actually, the two jaw elements in use are spaced or gapped at all times and the lever is prevented, by the previously mentioned shouldering, from overrun and is biased against the shoulder by the lever spring. The shoulder, as will be appreciated, is located upon assembly of solenoid and lever assemblies.

When the solenoid is energized, the armature is driven against the blocking pin overcoming the return bias of the blocking pin spring. The pin then enters the recess at the back of the lever blocking any possible opening movement of the lever. Since there is no integral connection between the blocking pin and the armature, there can be no bind on the armature by radial pressures applied to the pin. The alignment of pin and armature is thus rendered less critical than formerly believed. On de-energization of the solenoid coil, the blocking pin spring returns the armature and moves the pin from the blocking position in the recess of the lever.

When in the de-energized condition the jaws may be forced apart by movement of the lever and lever jaw insert against the spring bias on the lever for insertion of an arming ring or wire. The amount of force required to insert and withdraw the wire or ring is a function of the compression or bias strength applied to the lever by the lever spring. For example, at three pounds, well below the pressure to arm the bomb or projectile served, the ring can be inserted and pulled free of the jaws when the arming unit is de-energized. However, upon energization, the jaws cannot be forced open and the ring or wire is thereupon securely held so that when the bomb or projectile is released the falling projectile arms itself as it falls away from the aircraft, the wire and/or ring being held secure by the arming unit.

*Specific description*

Referring particularly to the drawings, the structure of the present invention can be appreciated in more complete detail. In FIGURE 1, the assembled arming unit 11 is shown in a top plan view as an embodiment of the present invention. To best appreciate the substantial improvement of the present invention, the entire unit is now produced so that its length need not exceed about two and one-half inches. The solenoid assembly 12 is shown coaxially secured to the lever assembly 13. Mounting boss 14 is integrally cast in the tubular lever assembly 13. An integral jaw piece support 15 extends from the lower forward or front portion of the lever assembly 13 as shown. The lever 16 carrying jaw insert 17 is seen projecting above the jaw piece support 15. Electrical connectors 18 extend from the rear of the solenoid assembly 12 and are potted in-situ in resin 19 as seen.

Figures 2, 3:
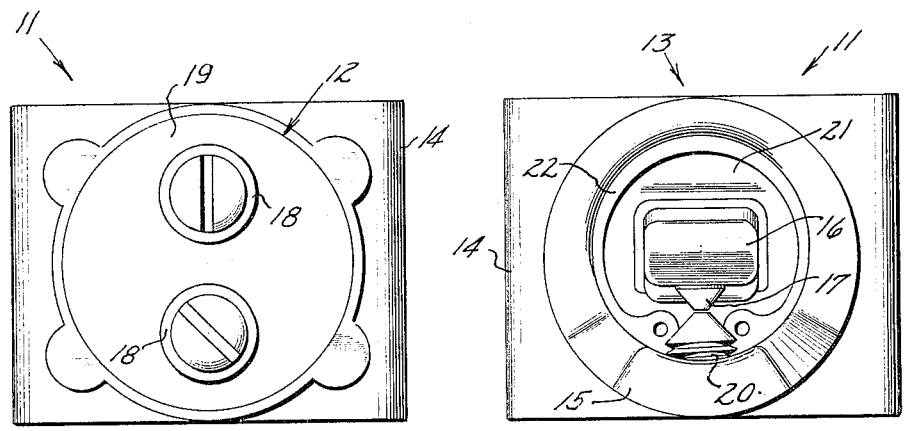
FIGURE 2 is an end elevation view of an arming device in accord with the present invention and taken from the front or jaw end of the device and indicating the normal closed spaced relationship between the jaws.
FIGURE 3 is an end elevation of the structure of FIGURE 1 taken from the rear or solenoid end of the arming device.

By reference to FIGURE 2 the jaws formed by fixed and threaded jaw element 20 with lever jaw insert 17 is best appreciated. The gapping between the jaws 17 and 20 can also be appreciated. Both jaw pieces 17 and 20 are frusto-conical in form and slightly truncated at their points of closest registry. The lever element 16 is seen extending through a resilient boot seal 21 retained in position by the retainer ring 22.

By reference to FIGURE 3, the solenoid assembly 12 is best appreciated as generally cylindrical in form secured to the lever assembly 13 with the electrical connectors 18 extending from the rear and the connectors 18 potted in place by the resin 19 which, as will be seen, fully encapsulates the electrical elements of the arming unit 11. The interior construction of the arming unit 11 is best understood by reference to the cross section of FIGURE 4. The generally tubular cylindrical character of the solenoid assembly 12 and the lever assembly 13 is more clearly expressed and the coaxial relationship between the two assemblies 12 and 13 is best appreciated. The solenoid case or housing 23 is tubular and closed at the forward end by a threaded connector piece 24 brazed to the periphery of the tubular housing 23 and having an opening 25 therethrough. The opening 25 is located on the axis of the solenoid assembly 12 and receives the blocking pin bushing 26. The blocking pin bushing 26 is inserted in the opening 25 and shoulders against the rear of the threaded connector piece 24 and is peripherally brazed or otherwise connected thereto. The bushing 26 is provided with an axial opening 27 therethrough on the axis of the solenoid assembly 12. The bushing 26 provides a journal portion 28, a spring pocket or recess 29 and an internal conic flared portion 30 at the rearward portion of the opening 27. The blocking pin 31, headed at the rear end and extending through the opening 27, is reciprocable in the recess 29 and opening 27 subject to the bias of the compression type blocking pin spring 32 located in the recess 29 and bearing against the head portion 33 of the pin 31. The head portion 33 of the pin 31 is urged by the spring 32 into following contact with the plunger or armature 34. The plunger or armature is frusto-conical at its forward end 35 and is otherwise cylindrical in form. As will be appreciated, the conic relation between the male end 35 of the armature 34 and the female open flare 30 of the bushing 26 substantially avoids hang-up of the armature 34. The armature or plunger 34 is axially moveable in the opening 36 being journalled or guided by the tubular extension 37 of the flanged end bell 38. As will be seen the end bell 38 is assembled flush against a spool 39 and the opening 36 defined by the spool 39 is also supported by the bushing 26. The spool 39 contains the coil 40 wound concentrically about the axis of the solenoid assembly 12. The electrical leads 41 and 42 extend from the coil 40 and are secured as by solder to the bases 43 of the connectors 18. A disc membrane 44 closes the opening 36 and is secured against the flanged portion of the end bell 38. A locator disc 45 having connector spaced openings 46 therethrough provide locating means for the connectors 18. The discs 45 and 44 are both prepared from materials having good insulating properties and are of a diameter less than the internal diameter of the solenoid case or housing 23. Upon assembly the blocking pin 31 is located so as to be flush with the foremost plane face 46a of the blocking pin bushing 26. Thus, the pin 31 is supported by the spring 32 from extension into the lever assembly 11 until selected energization of the coil 40.

The lever housing 47 is tubular, except for the mounting boss 14 and is provided with an axial opening 48 therethrough. The opening 48 is generally coaxial with the axis of the solenoid assembly 12 upon assembly. The rear end of the lever housing 47 is provided with female threads 49 providing a connection to the male threaded extension 50 of the connector 24.

A lower protrusion or support apron 15 extends from the front end of the lever housing 47 and a transverse threaded opening 51 is provided therethrough and into which the fixed jaw element 20 is threadably passed. The axis of the threaded opening 51 is coaxial with the jaw insert 17 carried by the lever 16. The threaded jaw element 20 can be thus adjusted to attain suitable gapping as between the jaw insert 17 and conical jaw element face 52. Both jaw elements 17 and 20 are frusto-conical at their work faces except for the truncation in a plane at right angles to their axes at the tips thereof.

The lever 16 is thus seen as an elongate element carrying the jaw insert 17 at one end and pivoting on the fulcrum provided by the pivot pin 53 passed transversely through the housing 47 and through the approximate center of the lever 16. The rearmost upper edge 54 of the lever 16 is seen to shoulder, on assembly, against the inner concentric face 55 of the connector piece 24. In this position the rear of the lever 16 is positioned so that the blocking recess 56 is in registering alignment with the blocking pin 31. The lever 16 is maintained in this normal position by lever spring 57 of the compression type which is pocketed in the pocket 58 of the lever 16 and bears adjustably and guidably on the screw 59 transversely extending into the longitudinal cavity 48 of the lever assembly 13. The spring 57 thus contacts the lever 16 midway between the fulcrum of pin 53 and the rearmost portion of the lever 16. The lever 16 will be seen to be confined against displacement on the fulcrum or pivot 53 by confining internal walls of the housing 47.

The flexible boot seal 21 is retained against release by flange engagement with the protuberance 61 on the lever 16 and is maintained in seal relation by washer 62 and retainer ring 22 snap secured in the annular groove 64 by deforming the retainer ring 22 using the ears 63. The boot seal 21 is held peripherally against the seal shoulder 60 in the housing 47.

Figure 4:
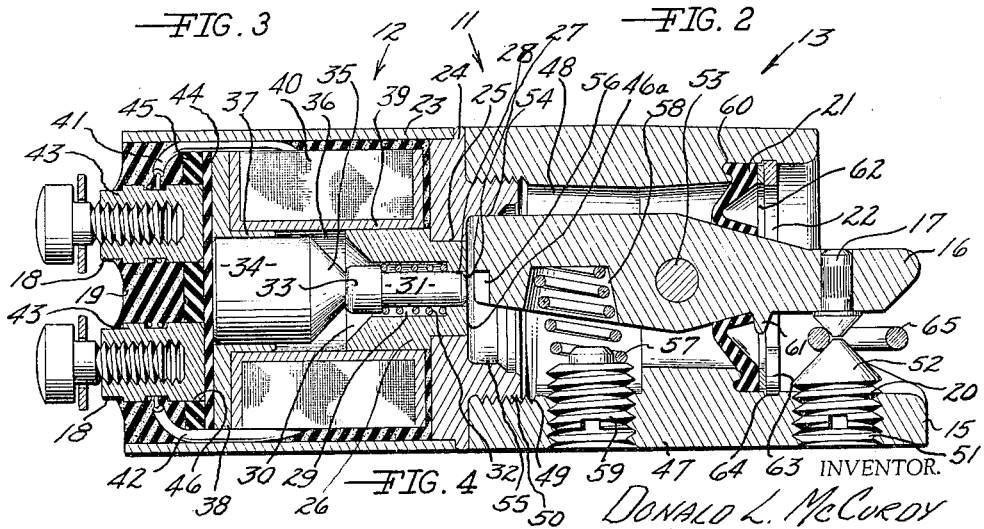
FIGURE 4 is a full cross-section elevation view of the arming device shown in FIGURE 1 taken on the line IV—IV of FIGURE 1.

As thus described, the solenoid assembly 12 is secured to the lever assembly 13 and in de-energized condition the spring 57 exerts a positioning bias on the lever 16 holding it normally in the position shown in FIGURE 4. When the arming ring 65 is pushed between the jaws 17 and 20, the bias of spring 57 is overcome and the jaws 17 and 20 admit the ring 65. Then the jaws 17 and 20 resume their spaced apart position as shown. If the ring 65 is pulled with sufficient force to overcome the bias of lever spring 57 while the solenoid assembly is de-energized, then the ring 65 will pull free of the jaws 17 and 20, the lever 16 tilting on the lever pivot 53 and compressing the spring 57. When the ring 65 is snapped into position as shown in FIGURE 4 and the solenoid assembly 12 is energized the armature or plunger 34 is moved forward from its rest position, as shown in FIGURE 4, and overcomes the bias of the blocking pin spring 32 thus moving the pin 31 into the blocking recess 56 thereby blocking all movement of the lever 16 and fixing the movable jaw 17 is relation to the fixed jaw 20. In this condition the ring 65 cannot be withdrawn and if a bomb or projectile is dropped free of the aircraft the ring 65 remains firmly gripped against removal, thereby arming the projectile or bomb. Upon de-energization of the coil 40 either before or after release of the bomb or projectile, the armature or plunger 34 is returned to position shown in FIGURE 4 by action of spring 32 and the pin 31 follows the movement providing contact with the plunger 34 and utilizing the bias of spring 32. This arrangement provides a disconnect between pin 31 and plunger 34 so that any radial pressures imposed on the pin 31 are not transmitted to the solenoid plunger or armature 34 thereby eliminating hang-ups in the solenoid mechanism. Axial movement, on the other hand, is smooth in both pin 31 and armature 34 and absolute axial alignment between pin 31 and armature 34 is delimited. Parts are substantially reduced in number and size and are simplified. The single movable lever 16 and jaw 17 allows closer control over spacing intermediate the jaws 17 and 20 using the fixed jaw 20 as an adjustable base. The assembly and manufacture of arming units 11 is greatly simplified as will be appreciated in reference to FIGURES 5 and 6.

In FIGURE 5 the coil 40 is wound on the spool 39 and the leads 41 and 42 extend therefrom. The end bell 38, with chordal portions 66 removed therefrom, is pressed into the spool 39 providing locating control for one end of the solenoid assembly 12 and providing journalling for the armature or plunger 34. Into the front end of the solenoid assembly 12 the connector 24, with the bushing 26 secured therein, is axially provided with spring 32 and blocking pin 31 and is thereupon pressed into the front portion of the spool 39. Depending upon the extent of insertion, the proper spacing of the pin 31 is obtained on assembly since the disc 44 provides a bottoming barrier to movement of the plunger 34. As will be seen, the disc 44 also prevents the encapsulating resin 19 from flowing into the armature cavity 36. Notches 67 in the disc 44 are aligned with notches 68 in the locating disc 45 through which the leads 41 and 42 are passed for connection to the electrical connectors 18 which are positioned in the openings 46 preliminary to potting. The discs 44 and 45 are spaced apart from contact with the walls of the solenoid housing 23 so as to allow clearance for passage of the encapsulating resin 19. A resin 19 (FIGURE 4) having high dielectric strength and excellent resistance to thermal shock as, for example, the epoxy resins, is poured into the electrical connector end of the solenoid assembly 12 and is cured in situ. The result is an in-situ sealing of all of the electrical components in the solenoid assembly as best seen in FIGURE 4.

In FIGURE 6 the simplicity of the lever assembly 13 is clearly appreciated. The jaw 17 is pressed into the lever 16 and the lever 16 is located within the lever housing 47 and the fulcrum pin 53 is passed through the housing 47 and support lever 16. The spring 57 is inserted upwardly through the housing 47 to engage in the pocket 58 (FIGURE 4) on the underside of the lever 16. Guidance and adjustment is accomplished by the screw 59. The boot seal 21 is pushed over the front portion of the lever 16 and protuberance 61 and is positioned in the housing 47 peripherally bearing against the seal shoulder 60. The washer 62 then peripherally bears on the boot 21 and the retainer ring 22 is sprung into position in the groove 64 by deformation imparted by means of the ear pieces 63. Then the jaw piece 20 is threadably inserted in the fixed jaw support extension 15. With the lever assembly 13 thus assembled, the lever assembly 13 is screwed onto the solenoid assembly 12, the threads 49 engaging the male thread extension 50 of the connector piece 24. The threaded fixed jaw 20 is then backed off to provide the suitable gauged gapping as between jaw 17 and jaw 20. Fasteners, not shown, are passed through the boss mounting 14 to secure the arming unit 11 to air frames (not shown).

In FIGURE 4 it will be seen that the end bell 38 is pushed against an interference fit with the housing 23 until the end of the pin 31 is flush with the mounting surface of the threaded connector piece 24 which mounts against the lever housing 47. The distance from the housing mounting face to the top of the lever 16 against which the stop pin 31 seats, when the solenoid is energized, is controlled so that it is always less than the available travel distance of the plunger air gap. This assures that the mating conical surfaces of the plunger 34 and the bushing 26 avoid contact which could cause the parts to freeze.

The arming unit 11 has substantially increased reliability, is extremely compact and is easy to assemble and construct. Clearance problems arising by reason of twin moving jaws and complex armatures are substantially avoided and the axial orientation of the power train avoids serious hang-up problems.

Having thus described an operative form of my invention, a wide variety of changes, modifications and improvements will be readily appreciated by those skilled in the art and such changes, modifications and improvements are intended to be included within the scope of my invention limited only by the scope of my hereinafter appended claims.

I claim:
1. In an arming unit, the combination comprising:
   (a) a solenoid including a coil and an axially movable armature;
   (b) a spring biased pin in following engagement with said armature of said solenoid;
   (c) a lever structure provided on one end with a jaw piece and at the other end defining a recess in normal register with the axis of said pin;
   (d) a housing about said lever structure including a fixed adjustable jaw piece in register with said lever mounted jaw piece and said housing providing a fulcrum in tilting support of said lever;
   (e) a lever bias applied to said lever intermediate said recess end and said fulcrum position biasing said jaws toward each other; and
   (f) a connector coaxially supporting said solenoid and said lever housing and providing a shoulder stop limiting movement of said lever in one direction and axially registering said pin with said recess in said lever.

2. A blocking lever structure for a solenoid operated arming unit comprising:
   (a) a threaded connector ring having an internal concentric shoulder and an axial opening therethrough;
   (b) a lever housing threadably connected to said connector ring in a coaxial position;
   (c) a lever tiltably supported in said lever housing and having one end extended to engage said shoulder in said connector ring and defining a recess thus positioned on the axis of said connector;
   (d) a bias means urging said lever into normal contact with said shoulder;
   (e) a jaw piece in said lever through the end of said lever opposite said shouldering end of said lever and movable therewith; and
   (f) a second jaw piece in axial register with said first mentioned jaw piece when said first mentioned jaw piece is closed toward said second jaw piece and adjustable axially to provide a selected gap between said jaw pieces.

3. A power train structure for an arming unit comprising:
   (a) a spool;
   (b) a coil wound on said spool;
   (c) an end bell supporting one end of said spool and providing a coaxial bearing;
   (d) an armature axially movable within said spool and journalled in said bearing portion of said end bell;
   (e) a blocking pin engaged axially with said armature;
   (f) a bushing axially having an opening therethrough supporting said pin and axially supporting said spool;
   (g) a bias intermediate said pin and said bushing urging said pin into following contact with said armature;
   (h) a support connector concentric about said bushing;
   (i) a tubular sheath housing into which said connector and said coil is inserted; and
   (j) an insulating material encapsulating said coil and sealing said coil and support connector against leakage.

References Cited by the Examiner
UNITED STATES PATENTS

| | | | |
|---|---|---|---|
| 1,385,598 | 7/1921 | Weed | 89—1.5 |
| 2,845,003 | 7/1958 | Thomas | 89—1.5 |
| 2,922,340 | 1/1960 | Wilkie | 89—1.5 |
| 2,992,594 | 7/1961 | Anderson et al. | 89—1.5 |

BENJAMIN A. BORCHELT, *Primary Examiner.*

W. C. ROCH, *Assistant Examiner.*